United States Patent
Hansson et al.

(10) Patent No.: US 6,339,713 B1
(45) Date of Patent: Jan. 15, 2002

(54) DECREASING BATTERY CONSUMPTION OF MOBILE TERMINALS BY DECREASING MONITORING OF THE MULTIPLE ACCESS CHANNEL DOWNLINKS

(75) Inventors: Rolf Hansson, Kungsängen; Anders Herlitz, Älta, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/132,058

(22) Filed: Aug. 11, 1998

(51) Int. Cl.[7] .................................................. H04Q 7/32
(52) U.S. Cl. ........................ 455/574; 455/524; 370/311
(58) Field of Search ............................... 455/38.3, 574, 455/343, 517, 524, 514, 550, 528; 370/311, 329, 336, 337

(56) References Cited

U.S. PATENT DOCUMENTS

| | | | |
|---|---|---|---|
| 5,175,870 A | * 12/1992 | Mabey | 455/343 |
| 5,193,209 A | * 3/1993 | Maeda et al. | 455/528 |
| 5,230,084 A | * 7/1993 | Nguyen | 455/343 |
| 5,594,738 A | 1/1997 | Crisler et al. | 370/347 |
| 6,049,532 A | * 4/2000 | Steele et al. | 370/311 |
| 6,049,724 A | * 4/2000 | Rozenblit et al. | 455/574 |
| 6,058,289 A | * 5/2000 | Gardner et al. | 455/574 |

FOREIGN PATENT DOCUMENTS

| | | |
|---|---|---|
| EP | 0 462 572 A2 | 12/1991 |
| EP | 0 652 680 A2 | 5/1995 |
| EP | 0 720 310 A1 | 7/1996 |

OTHER PUBLICATIONS

Standard Search Report for RS 101877 US completed on May 4, 1999, filed May 6, 1999, EPO.

* cited by examiner

*Primary Examiner*—Edward F. Urban
(74) *Attorney, Agent, or Firm*—Jenkens & Gilchrist. PC

(57) ABSTRACT

A power management method and system is used with mobile terminals and base stations of a wireless communications system. A conventional random access channel downlink that provides information on whether the channel is available for use by a new mobile terminal is enhanced. While a first mobile terminal is establishing a connection with and transmitting a message to a base station, the base station repeatedly transmits a random access channel downlink that includes the number of units of time remaining in the current message transmission. A second mobile terminal wishing to establish communication with the base station receives and processes this information. Normally, the second mobile terminal would continuously monitor the channel until an idle indication is detected. However, by knowing the number of units of time remaining for the current message transmission, the second mobile terminal can conserve battery power by ceasing reception and processing of the downlinked slots until the specified time has expired.

17 Claims, 5 Drawing Sheets

DECREASING BATTERY CONSUMPTION OF MOBILE TERMINALS BY DECREASING MONITORING OF THE MULTIPLE ACCESS CHANNEL DOWNLINKS

DESCRIPTION OF RELATED ART

Mobile wireless communication is becoming increasingly important for safety, convenience, and efficiency. One prominent mobile communication option is cellular communication. Cellular phones, for instance, can be found in cars, briefcases, purses, and even pockets. As cell phones have become smaller for improved portability, battery size and weight has become a critical barrier to further cell phone miniaturization. One technique to limit the required size and weight of batteries is to reduce the power demands placed on them. Consequently, cell phone portability (as well as standby and talk time) can be improved through power management.

In wireless communications systems, procedures for establishing communication and transmitting messages between mobile terminals and base stations are defined. For instance, when a mobile terminal wishes to transmit a message or set-up a phone call, the mobile terminal must establish communication with a proximate base station.

Referring to FIG. 1A, a cell in a mobile communications system is diagramed at 100. In cell 100, two mobile terminals are attempting to establish a connection with a base station 110. A mobile terminal 120 is "attempting to secure a random access channel" (ASRAC) via ASRAC120 to the base station 110, and a mobile terminal 130 is attempting to secure a random access channel via ASRAC130 to the base station 110 (i.e., "random" access). The transmission ASRAC120 is received and processed prior to the transmission ASRAC130 in this example. The phrase "attempting to secure a random access channel" is also termed "attempting to establish a connection" (e.g., with a base station) within this document.

Referring to FIG. 1B, cell 100 is illustrated where the base station 110 is busy establishing a connection with and receiving a message from the mobile terminal 120. A downlinked control channel message 140 initially includes a response code that corresponds to the mobile terminal 120 and constantly includes information indicating that the base station 110 is busy (e.g., a "B"). Note that for diagrammatical clarity thin arrows represent point-to-point transmissions while thick arrows represent point-to-multipoint transmissions, such as from the base station 110 to all mobiles within cell 100.

The mobile terminal 130 receives and processes the information in the downlink control channel message 140. The mobile terminal 130 must continue to monitor the downlinked control channel message 140 until the busy indication "B" is changed. Unfortunately, this monitoring consumes battery power in the mobile terminal 130. Note that although the mobile terminals 120 and 130 are represented as vehicles, this is primarily to represent their mobility. In fact, the mobile terminals 120 and 130 may be hand-held devices in which battery life is a critical feature to users.

Continuing now with FIG. 1C, a cell 100 is illustrated where a base station is idle and available for an attempt to establish a connection with a new mobile terminal. Once the base station 110 has completed the communication with the mobile terminal 120, the base station 110 transmits a downlink control channel message 150 with an idle indication "I". The mobile terminal 130 detects the idle indication "I" and responds with another ASRAC130 to establish a connection with the base station 110. The mobile terminal 130 can then complete the useful process of transmitting its message.

In contrast to the useful connection establishment and message transmittal procedure diagramed in FIG. 1C, the mobile terminal 130 is achieving no useful purpose while it consumes energy in FIG. 1B. The mobile terminal 130 is monitoring the downlink control channel messages 140 to detect when the indication switches from "B" for busy to "I" for idle. This monitoring consumes power and can last for an extended amount of time when, for example, the mobile terminal 120 in FIG. 1B is transmitting a lengthy message.

In summary, mobile terminals in the prior art have heretofore been required to expend battery power while monitoring a downlinked communication from a base station when they wish to establish a connection with the base station and the multiple access channel is currently busy.

SUMMARY OF THE INVENTION

The system and method of the present invention, which belongs to the field of power management for extending the useful battery life of mobile terminals in wireless communications systems, enables mobile terminals to reduce power while waiting for a shared multiple access channel to become available. In accordance with the present invention, a base station transmits information that indicates the amount of time remaining until a current occupier of the shared multiple access channel will complete its message.

Traditionally, when a second mobile terminal wishes to transmit a message over a shared multiple access channel that is currently occupied by a first mobile terminal, the second mobile terminal constantly monitors the shared multiple access channel downlink in order to detect when the channel switches from busy to idle. This constant monitoring squanders battery power and, therefore, contributes to large battery requirements and unnecessarily reduces the standby and conversation time of the second mobile terminal.

According to the present invention, during a message transmission of the first mobile terminal, the base station transmits, in addition to a busy indication, a number of remaining units that corresponds to the number of units remaining until completion of the first mobile terminal's message. When the second mobile terminal checks the multiple access channel downlink because it wishes to transmit its own message, the second mobile terminal will detect both an busy indication and the number of remaining units.

Consequently, the second mobile terminal can then cease monitoring the channel until the specified number of remaining units has transpired. Afterwards, the mobile terminal can again check the channel to determine whether the channel is indicated as idle. By ceasing the constant monitoring of the multiple access channel downlink, the second mobile terminal conserves power and thus extends the useful life of the battery.

An important technical advantage of the present invention is that it provides power management features for mobile terminals in wireless communications systems.

Another important technical advantage of the present invention is that it provides power management features for mobile terminals during random access procedures.

Yet another important technical advantage of the present invention is that it transmits durational indicators that inform mobile terminals of the time remaining until completion of a current message transmission procedure.

Yet another important technical advantage of the present invention is that it enables mobile terminals to conserve power while awaiting an idle random access channel by obviating any need to constantly monitor a busy/idle condition.

Yet another important technical advantage of the present invention is that it provides a system and method that can be implemented for new mobile terminals without interfering with the functioning of existing mobile terminals.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, software elements, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

Figure 2A:
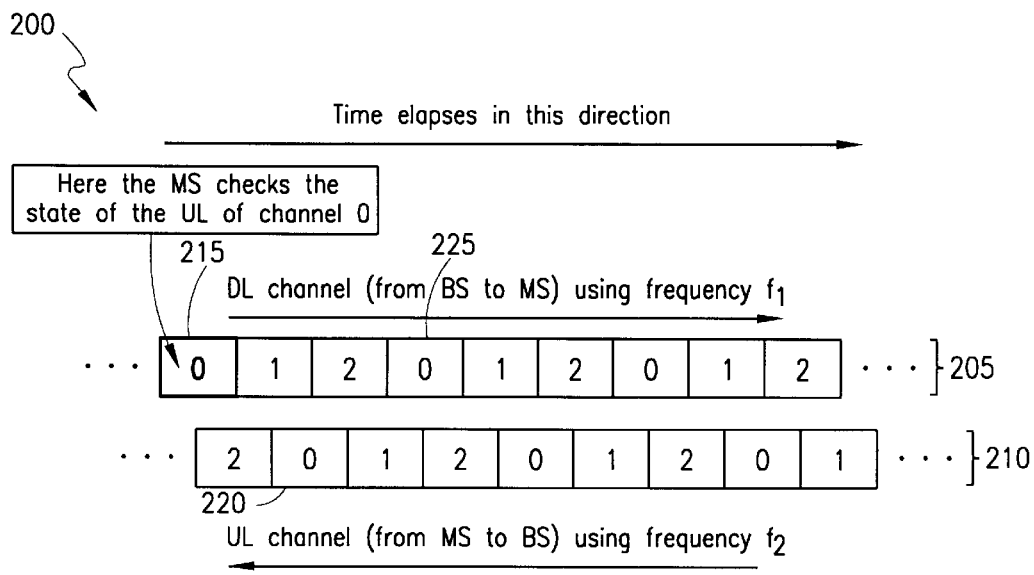
FIG. 2A illustrates a random access procedure with both uplink and donwlink aspects for the PDC.

Aspects of the air interface for the Personal Digital Cellular System (PDC) of Japan (formerly called the Japanese Digital Cellular System (JDC)) will be used to describe a preferred embodiment of the present invention. Referring now to FIG. 2A, a random access procedure with both uplink and donwlink aspects for the PDC is illustrated generally at 200. The random access procedure 200 includes a downlink (DL) random access channel 205 on a first frequency $f_1$ and an uplink (UL) random access channel 210 on a second frequency $f_2$. It should be noted that the terms "random access channel" and "multiple access channel" are used interchangeably within this document.

The random access channels 205 and 210 are slotted as shown in FIG. 2A. The slots are numbered to represent individual channels within DL and UL random access channels 205 and 210. These individual numbered channels are interleaved so that a mobile terminal (or mobile station (MS)) receives information at different times than it transmits information. For example, each individual number "1" channel/slot in the DL channel 205 is offset from the corresponding individual number "1" channel/slot in the UL channel 210. Each individual numbered channel/slot in the DL channel 205 contains information regarding the busy/idle state of the corresponding individual numbered channel/slot in the UL channel 210.

When a mobile terminal wishes to transmit data to the cellular network, it can monitor the DL random access channel 205 and can subsequently use the UL random access channel 210. The mobile terminal first receives and processes a slot on the DL channel 205. For example, the mobile terminal may receive the bolded DL "0" slot 215. In this DL "0" slot 215, as preferably in every DL slot of the DL channel 205, a specific field will indicate the busy/idle state for the corresponding UL channel 210 slot, specifically the underlined DL "0" slot 220 in this example.

If the state is idle, the mobile terminal starts to transmit the first piece of information in the underlined DL "0" slot 220 (i.e., the mobile terminal "attempts to secure the random access channel '0'" or "attempts to establish a connection" with the base station). Subsequently, the mobile terminal will try to confirm that it has secured the UL "0" channel/slot by receiving and processing the next DL "0" slot 225. The mobile terminal will compare a downlinked partial echo (PE) to a PE that it has calculated, as is explained in greater detail below. If the PEs match, then the mobile terminal knows that it has been granted the UL "0" channel/slot and may transmit the remainder of the information in its message while other mobile terminals are blocked out from the UL "0" random access channel. This procedure will be termed "acquisition or securement of a random access channel" in this document.

Figure 2B:
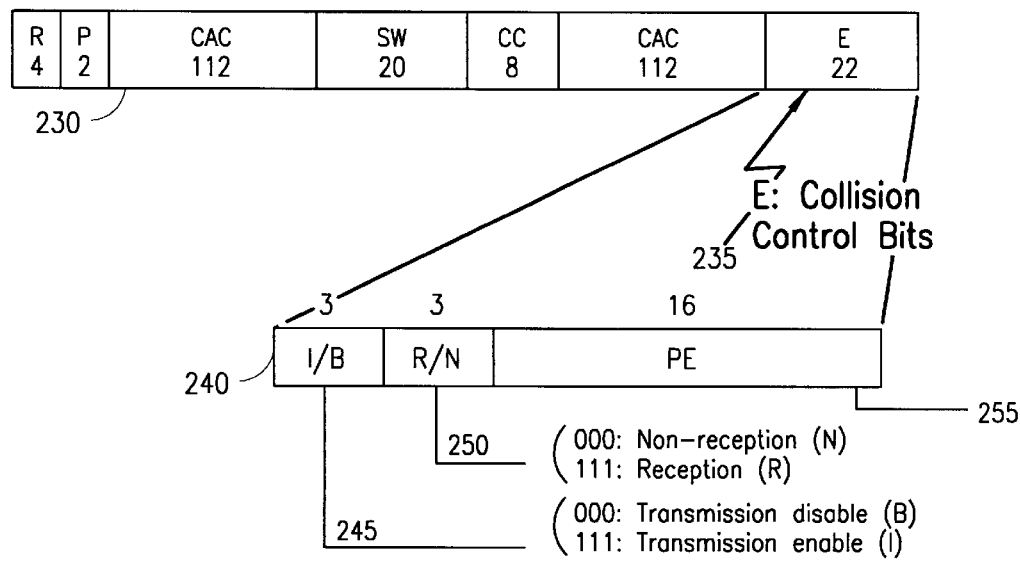
FIG. 2B illustrates a downlink signaling format of the air interface standard for the PDC.

Referring now to FIG. 2B, the downlinked signaling format 230 for the control physical channels (CPCH) of the air interface standard for the PDC is illustrated. The downlink signaling format 230 is composed of 280 bits that are divided into seven different fields as pictured in FIG. 2. The fields are further explained in Table 1.

TABLE 1

(downlink signaling format 230)

| Field Abbreviation | Definition | Bit Length |
|---|---|---|
| R | Guard time for burst transient response | 4 |
| P | Preamble | 2 |
| CAC | Control signal (PCH, BCCH, SCCH, UPCH) | 112 |
| SW | Synchronization word | 20 |
| CC | Color Code | 8 |
| E | Collision control bits | 22 |

The control signal fields (CAC) can be occupied by any of the Paging Channel (PCH), Broadcast Control Channel (BCCH), Single Cell Signaling Channel (SCCH), or User Packet Channel (UPCH).

The UPCH is a channel that can be used to transfer user packet data. The uplinked UPCH is a random access type. The SCCH is a channel that can be used for transmitting information between the network and mobile units. It is used, for example, by a mobile terminal in response to a page by a base station, or by a mobile terminal to access the system for a call origination or network registration. The uplinked SCCH is also a random access channel type. The PCH and the BCCH are defined for the PDC standard, but they are not particularly germane to the present invention and will not be explained in detail here so as not to obscure the present invention.

The UPCH is used for packet data transmission in the PDC; the UPCH carries both control signals and user data. The SCCH is used for circuit switched calls (e.g., voice and fax) in the PDC and carries only control signaling. Both the UPCH and the SCCH use the same air burst format and the same random access control scheme, namely the ICMA-PE. The ICMA-PE is the open channel control random access method with partial echo that is used in the PDC. The initiation of a connection, or the attempt thereof, (e.g., the attempt to secure a random access channel for message transmission) is described above with reference to FIG. 2A. The UPCH and the SCCH will be referred to as "random access channels" (RACs) below; however, the term "random access channel" (RAC) should not be considered as limited to the UPCH and the SCCH only.

Continuing with the description of the downlink signaling format 230 of FIG. 2B, the E field 235 contains 22 collision control bits, as indicated in Table 1 above. An exploded view of the E field 235 is diagramed at a detailed E field 240. The three fields of the detailed E field 240 are further explained in Table 2.

TABLE 2

(detailed E field 240)

| Field Abbreviation | Definition | Bit Length |
|---|---|---|
| I/B | Idle/Busy Set to Ones if the Uplink RAC is Idle; Set to Zeros if the Uplink RAC is Busy. | 3 |
| R/N | Received/Not Received Set to Ones if a Message was Received; Set to Zeros if a Message was Not Received. | 3 |
| PE | Partial Echo Set to Zeros if Channel is Idle or No Message was Received; Set to the CRC value Computed from a Received Message Otherwise. | 16 |

Figure 1A:
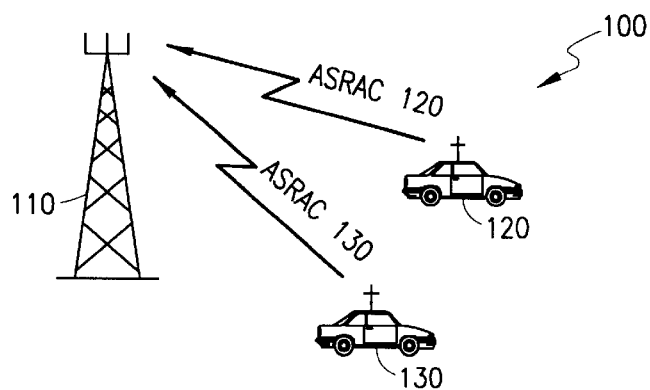
FIG. 1A illustrates a cellular communications system wherein two mobile terminals are attempting to establish a connection to the same base station.
Figure 1B:
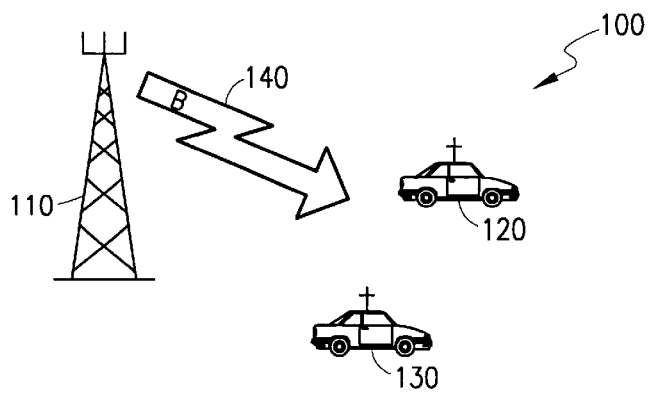
FIG. 1B illustrates a cellular communications system wherein a base station is busy receiving a transmission from a mobile terminal.

The I/B field 245 is set to "000" when the base station 110 (as shown in FIG. 1B) is engaged in establishing a connection with and receiving a message from the mobile terminal 120. The "0" digit is repeated for redundancy to ensure proper reception by the mobile terminals within cell 100. The I/B field 245 is set to "111" when the base station 110 (as shown in FIG. 1C) is idle, and the mobile terminal 130 can attempt to establish a connection.

The R/N field 250 is set to "000" when a message was not received by the base station 110 in the previous slot, and to "111" when a message was received by the base station 110 in the previous slot. The redundancy of the digit indication in the R/N field 250 is also to enhance reliability.

Figure 1C:
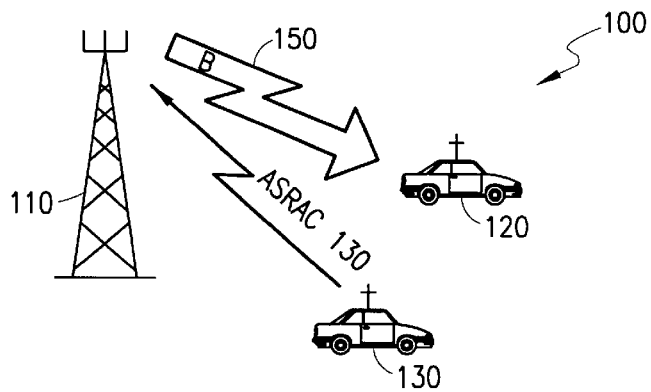
FIG. 1C illustrates a cellular communications system wherein a base station is idle and available for an attempt to establish a connection with a mobile terminal.

The PE field 255 is set to all zeros by the base station 110 if the channel is idle or no message was received (see, e.g., FIG. 1C). If a message was received on a previous uplinked RAC, the detected and checked cyclic redundancy check (CRC) bits from the RAC message that was received from the mobile terminal 120 are used as a partial echo (PE) in the downlink transmission.

As an example, the mobile terminal 120 transmits an RAC uplink ASRAC120 in FIG. 1A to the base station 110. This RAC includes a message from which the 16 CRC bits are computed. The downlinked control channel message 140 from the base station 110 in FIG. 1B includes the detailed E field 240. The I/B field 245 will be set to "000" to signify to other mobile terminals (e.g., the mobile terminal 130) that the base station 110 is busy. The R/N field 250 will be set to "111" because a message was received (from the mobile terminal 126 in the previous slot. The PE field will be set equal to the CRC bits computed from the message received from the mobile terminal 120. From the R/N field 250 and the PE field 255, the mobile terminal 120 will realize that it can continue its transmission without any further checking.

The base station 110 continues its transmission of an I/B field 245 that is equal to "000" until the transmission by the mobile terminal 120 is complete. The base station 110 subsequently begins transmission of an I/B field 245 that is equal to "111, " which informs the mobile terminal 130 that it can transmit via an uplinked RAC the ASRAC130 to establish a connection (as shown in FIG. 1C). With the system and method of the present invention, the mobile terminal 130 can conserve battery power by ceasing monitoring of the downlinked control channel while the downlinked control channel is occupied.

Figure 3:
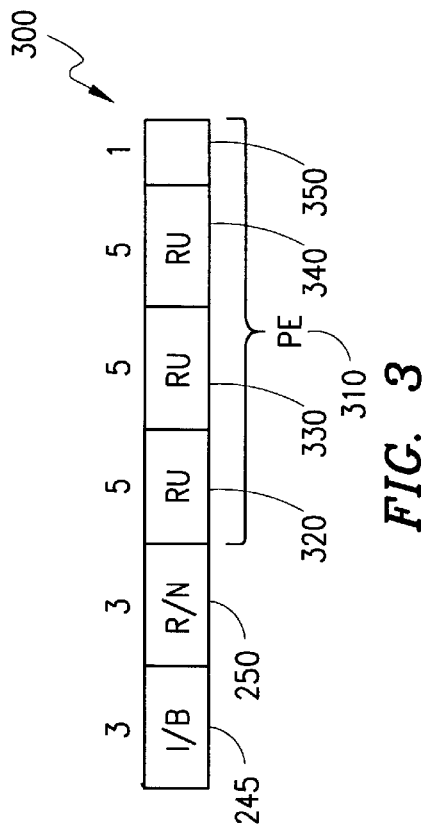
FIG. 3 illustrates an improved usage of the E field according to the present invention.

In order to implement a preferred embodiment of the invention, the downlinked E-field 235 (of FIG. 2B) is modified. Specifically, the PE field 255 includes additional information subsequent to a confirmation downlink slot that follows a connection establishment attempt. Referring to FIG. 3, a modified E field is illustrated at 300. The I/B field 245 and the R/N field 250 remain unaltered from the PDC standard. The 16-bit PE field 310, however, is modified. After a base station transmits a confirmation response, which includes the computed 16 CRC bits, to a connection attempt, the PE field 310 differs from a conventional PE field.

The PE field 310 is divided into three 5-bit Remaining Units (RU) fields 320, 330, and 340 and one 1-bit extra field 350. Each RU field corresponds to the time remaining until the current message is completed. Each RU field can be set to the number of units remaining to complete transmission of the current message. Preferably, each unit represents one slot in the time division multiple access (TDMA) protocol of the PDC. Notably, the RU field is repeated three times to ensure reliability. Furthermore, a mobile terminal preferably receives two equivalent RU fields 320, 330, or 340 before relying on the RU value.

Although the 16th bit, the 1-bit extra field 350, is shown after the 15 bits which are composed of the three RU fields 320, 330, and 340, it is to be understood that the 1-bit extra field 350 can precede the other 15 bits within the 16-bit PE field 310. In fact, the 1-bit extra field 350 can be placed anywhere within the 16 bits, such as between the RU field 320 and the RU field 330. Furthermore, the RU fields can be different bit lengths; for example, each RU field can be 4-bits with an extra 4-bit field. The illustrated 5-bit length of RU fields 320, 330, and 340 is a preferred embodiment.

Figure 4:
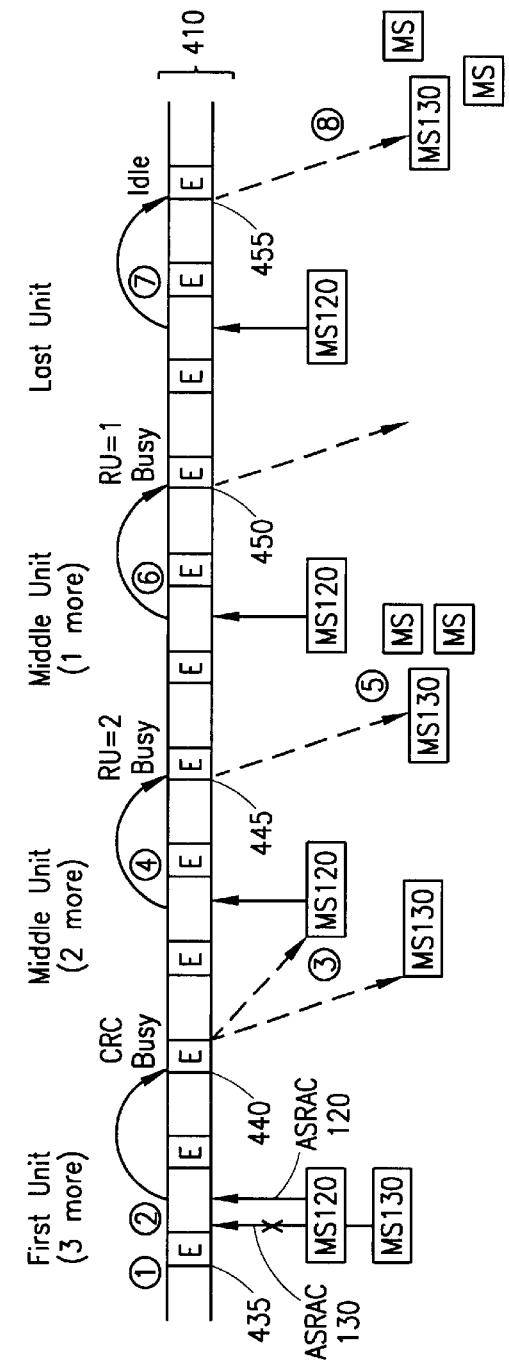
FIG. 4 illustrates an example of a random access control sequence according to the present invention.

Referring to FIG. 4, an example of a random access control sequence according to the present invention is illustrated at 400. The downlinked physical control channel 410 (from, e.g., the base station 110 of FIG. 1, where FIG. 1 incorporates the features of the present invention) represents repeated transmissions of downlink signaling format 230. The E field 235 is specifically denoted in the downlinked physical control channel 410. It should be noted that the downlinked physical control channel 410 uses a three-time-slot TDMA format in this embodiment. Hence, only every third E field 235 is relevant; the other E fields 235 belong to other channels.

Because both the mobile terminal 120 and 130 have data to send, they will each search for an idle RAC channel before starting the transmission. Each mobile terminal 120 and 130 will then transmit an ASRAC120 and ASRAC130, respectively, to attempt to establish a connection. Subsequently, each will examine the R/N field 250 and the PE field 255 to confirm that the message unit was correctly received by the base station 110. If a mobile terminal's message was not received, then it waits for an idle RAC to retransmit the message.

In FIG. 4, both the mobile terminal (or station) 120 (MS120 and 130 (MS130 have a message to transmit. These messages consist of four (4) bursts on the RAC, in this example. At ①, the RAC uplink is idle, which is indicated by the I/B field 245 in the detailed E field 240 on the downlinked control channel slot 435. Both mobiles start transmission of their respective connection attempts ASRAC120 and ASRAC130.

At ②, the base station 110 receives only the connection attempt ASRAC120 from the mobile terminal 120 uncorrupted. The base station 110 responds accordingly by setting the following indications in the detailed E field 240. The I/B field is set to busy; the R/N field is set to message received; and the PE field is set to the CRC value computed from the first part of the message transmitted in the connection attempt ASRAC120 received from the mobile terminal 120.

At ③, the mobile terminal 120 receives and processes the downlinked control channel slot 440. The mobile terminal 120 detects that the PE field 255 contains the CRC from the first part of the message transmitted in the connection attempt ASRAC120 that it transmitted. This PE field 255, together with the busy and received indications from the I/B field 245 and the R/N field 250, respectively, indicates to the mobile terminal 120 that it should continue transmitting its four-burst message. The mobile terminal 120 transmits the second of its four bursts at ④. The unit being transmitted by the mobile terminal 120 (as well as the number of units remaining to be transmitted) is denoted above the transmission arrow indications in FIG. 4.

As a further illustration of the RU fields 320, 330, and 340 (of FIG. 3) in actual use, their values in this example of FIG. 4 will be described. The RU fields 320, 330, and 340 are set equal to two (2) in the downlinked control channel slot 445 after the CRC confirmation in the downlinked control channel slot 440. In the next slot (the downlinked control channel slot 456, the RU fields 320, 330, and 340 are set equal to one (1). In the downlinked control channel slot 455, the PE field 255 returns to the standard zeros to correspond to the idle condition.

Meanwhile, the mobile terminal 130 inhibits its own transmissions in response to the downlinked control channel slot 440 at ③. Furthermore, in response to the RU fields 320, 330, and 340 in the downlinked control channel slot 445 at ⑤, the mobile terminal 130 ceases receiving and processing the downlinked physical control channel 410 in order to conserve power and therefore extend battery life. Thus, the mobile terminal 130 is not wasting battery power by constantly attempting to detect a change from the busy to the idle condition in the I/B field 245. Other mobile terminals at ⑤ may likewise save power by ceasing reception and processing for RU-1 time slot units. Although mobile terminal's 120 message was relatively short (four bursts in this example), it can be considerably longer. For example, with respect to short message services (SMS) and packet data in the PDC, messages can contain up to 18 units (bursts) Thus, the ceasing of reception and processing period effectively extends standby and conversation time.

At ⑥ and ⑦, the mobile terminal 130 transmits its third and fourth units (a second middle unit and the last unit). At ⑧, the I/B field 245 in downlinked control channel slot 455 indicates that the channel is idle again. The mobile terminal 130 (or another mobile terminal) may then make a connection attempt ASRAC130 to the base station 110 to establish a connection. It should be understood that the power saving features of the present invention are particularly advantageous when UL transmissions are composed of three or more units. When only two units are sent, the first includes the CRC information. The second E field 235 then relates the idle information, so the receiving mobile terminals may attempt to establish a connection thereafter. With three units to be transmitted, on the other hand, the first downlinked echo includes the CRC information, the second relates that one (1) unit remains to be transmitted, and the third relates the idle information.

Referring now to FIGS. 5A–5F and 6, a further elaboration of a preferred embodiment of the present invention will be explained by way of example. In FIGS. 5A–5F, a cell 500 includes a base station 510, a mobile terminal 520, and a mobile terminal 530. These mobile terminals 520 and 530 are represented as hand-held phones, as contrasted by the vehicles in FIG. 1, to accentuate the need for power management techniques that lengthen battery life and thus extend stand-by and conversation time.

The base station 510 includes a processing unit 512 and a memory unit 514. The mobile terminal 520 includes a processing unit 522 and a memory unit 524, and the mobile terminal 530 includes a processing unit 532 and a memory unit 534. The processing units 512, 522, and 532 in conjunction with the memory units 514, 524, and 534 enable the cellular communications system to implement the defined features of the PDC standard as well as those features of the present invention.

Figures 5A, 5B:
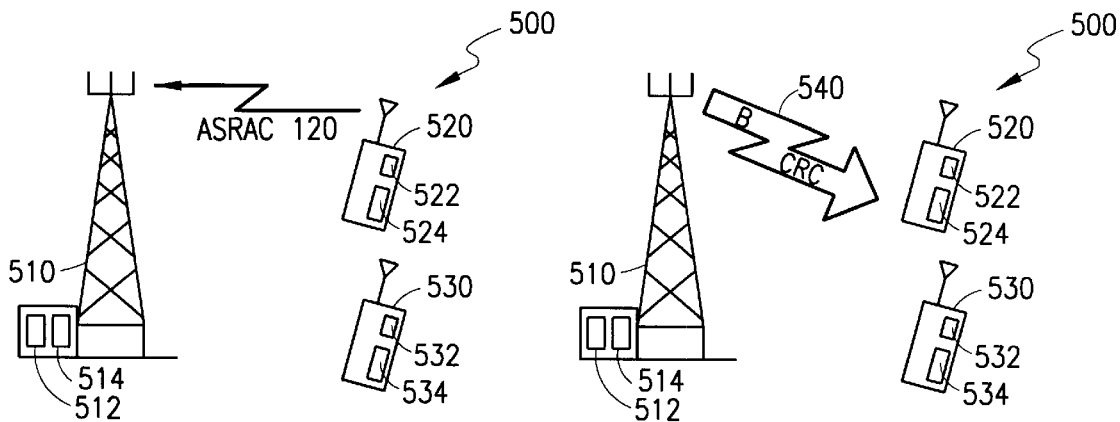
FIG. 5A illustrates a cellular communications system in which a first mobile terminal attempts to establish a connection with a base station according to the present invention.
FIG. 5B illustrates a cellular communications system in which the base station is confirming the first mobile terminal's attempt to establish a connection according to the present invention.

In FIG. 5A, the mobile terminal 520 wishes to establish a connection with the base station 510. The mobile terminal 520 transmits a connection attempt ASRAC520 to attempt to acquire a multiple access channel. This connection attempt ASRAC520 can be the first unit of a Link Access Procedures for Digital Mobile channels (LAPDm) frame in the PDC system. FIG. 5A corresponds to Step 610 of the flowchart 600 of FIG. 6, wherein the mobile terminal 520 is represented by "MT1".

In FIG. 5B, the base station 510 transmits a downlinked control message 540 that includes a busy indication "B", a received indication "R", and the CRC bits calculated from the first part of the message transmitted in the connection attempt ASRAC520 (e.g., the PE field 255 of FIG. 2B). Note that a thick arrow represents the downlinked transmission because it is intended for reception by all interested mobile terminals in cell 500 (i.e., a point-to-multipoint transmission). A thin arrow, on the other hand, represents a point-to-point transmission. The downlinked control message 540 is received by the mobile terminal 520. The mobile terminal 520 checks for the "R" indication and, if "R" is detected, for the CRC of the unit the mobile terminal 520 sent. The mobile terminal 520 realizes that it has secured the random access channel. FIG. 5B corresponds to Step 620, which explains that the base station ("BS") confirms receipt of the connection attempt from the "MT1".

Figures 5C, 5D:
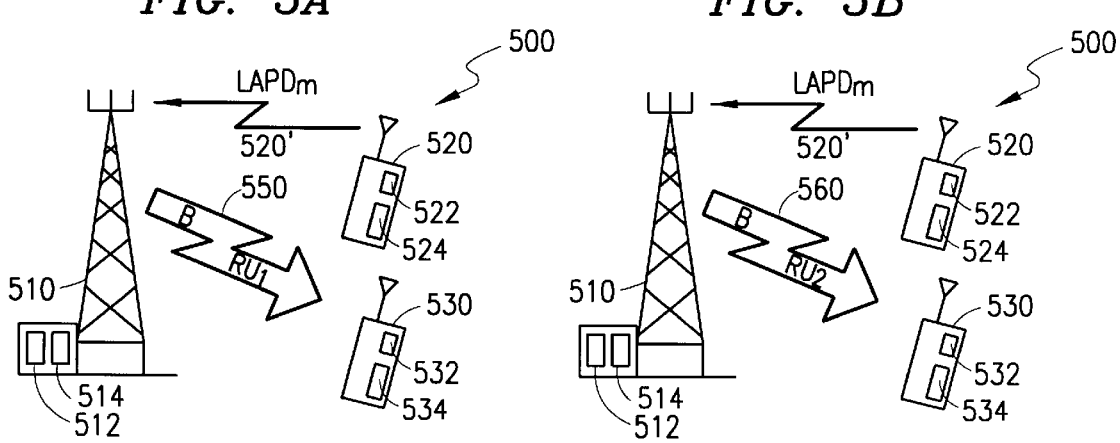
FIG. 5C illustrates a cellular communications system in which the base station transmits a number of remaining units in the first mobile terminal's message according to the present invention.
FIG. 5D illustrates a cellular communications system in which the base station transmits a reduced number of remaining units in the first mobile terminal's message according to the present invention.

In FIG. 5C, the mobile terminal 520 can begin sending the remaining units of its LAPDm frame 520' without checking for permission any further. The base station 510 continues sending the busy indication "B" in a downlinked control message 550. Furthermore, the base station 510 begins transmission of the remaining units "RU1" in the LAPDm frame 520' of the mobile terminal 520. This part of FIG. 5C corresponds to Steps 630 and 635, wherein "RU1" is represented by the "Time Remaining".

Next, the mobile terminal 530, wishing to acquire the random access channel by establishing communication with the base station 510, monitors the downlinked control channel and receives the downlinked control message 550. The busy indication "B" and the number of remaining units "RU1" of another mobile's transmission are detected by the mobile terminal 530. The mobile terminal 530 ceases monitoring the downlinked control channel in order to conserve battery power. It ceases monitoring for "RU1" time units. This aspect of FIG. 5C corresponds to Steps 670 and 675 of FIG. 6, wherein the mobile terminal 530 is represented by "MT2".

In FIG. 5D, the mobile terminal 520 continues transmitting the remaining units of its LAPDm frame 520' without checking for permission any further. The base station 510 continues sending the busy indication "B" in a downlinked control message 560. Furthermore, it begins transmission of the remaining units "RU2" in the LAPDm frame 520' of the mobile terminal 520. "RU1" and "RU2" are unspecified variables. For example, if the message of the mobile terminal 520 contains 12 units and the downlinked control message 550 of FIG. 5C occurs one time slot after the downlinked control message 540 of FIG. 5B, then the value of "RU1" is 10 units. The value of "RU2", therefore, may be between 9 and 1 units depending on the duration between the events of FIG. 5C and those of FIG. 5D.

In other words, in mathematical terms, the number of remaining units "RU2" is an updated number of units where "RU1–RU2" equates to the number of units that have been transmitted by the mobile terminal 520 between the downlinked control message 550 and the downlinked control message 560. This aspect of FIG. 5D corresponds to Step 640. If, in contrast to the description above with respect to FIG. 5C, the mobile terminal 530 had not wanted to establish a connection until FIG. 5D, then the mobile terminal 530 would have detected the number of remaining units "RU2" in Step 670 and would have ceased monitoring for "RU2" units of time in Step 675. In this instance, the "Time Remaining" in Steps 670 and 675 would represent "RU2" and correspond to the "Updated Time Remaining" in Step 640.

Figures 5E, 5F:
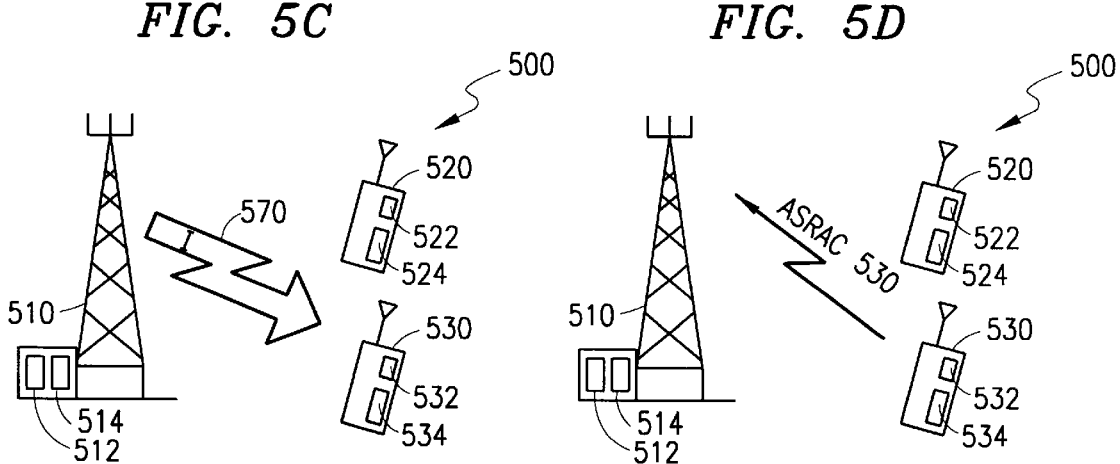
FIG. 5E illustrates a cellular communications system in which the base station transmits an idle indication according to the present invention.
FIG. 5F illustrates a cellular communications system in which a second mobile terminal attempts to establish a connection with the base station according to the present invention.
Figure 6:
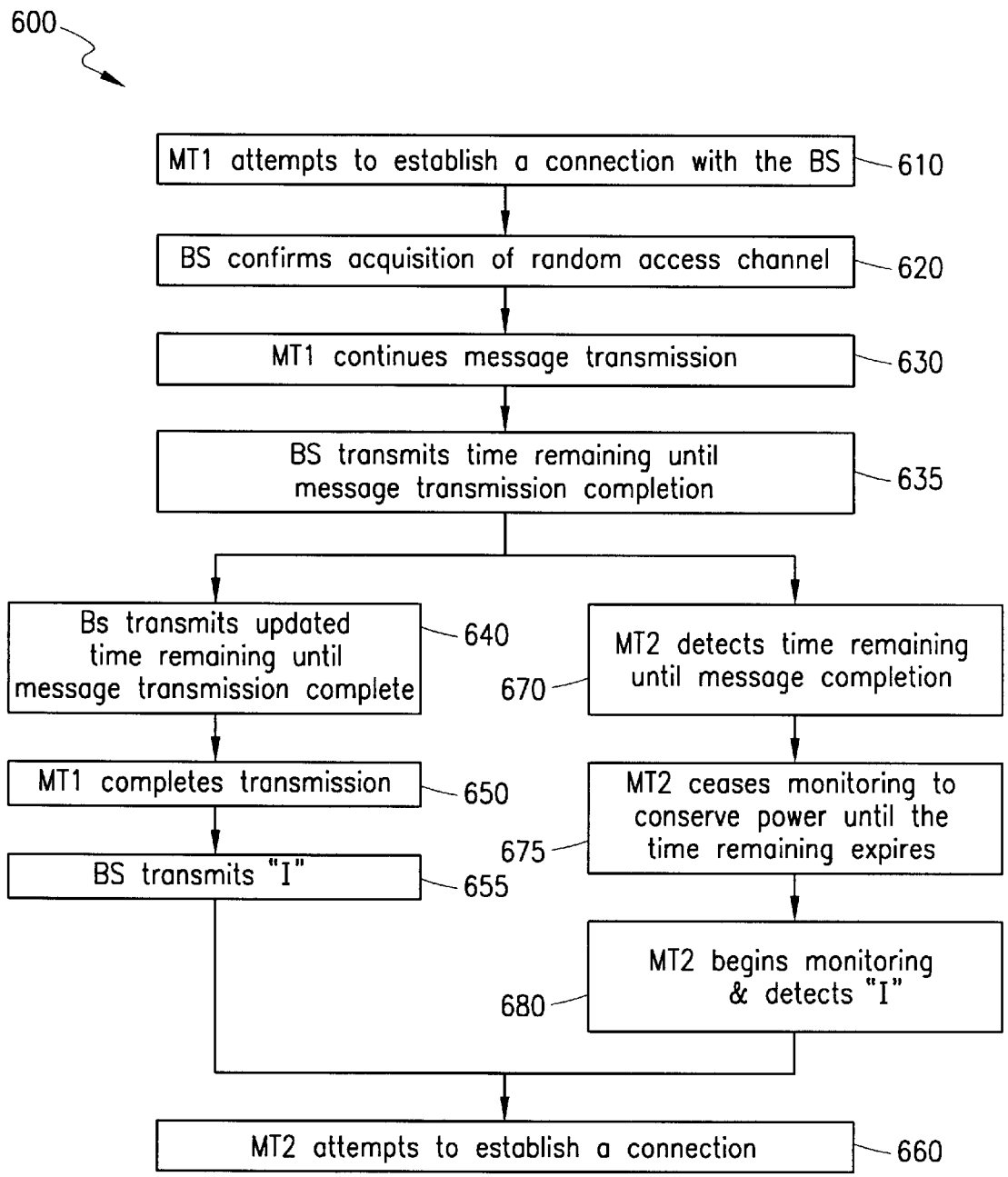
FIG. 6 illustrates in flowchart form a power saving method according to the present invention for use in a cellular communications system when a multiple access channel is occupied.

In FIG. 5E, the mobile terminal 520 has completed all of the units of its LAPDm frame 520', and the base station 510 begins sending the idle indication "I" in a downlinked control message 570. This part of FIG. 5E corresponds to Steps 650 and 655. Additionally, the mobile terminal 530 has waited for the "RU1" time units ("RU2" if the downlinked control channel was first monitored during FIG. 5D, or "Updated Time Remaining" as denoted in Step 640 of FIG. 6) to transpire and thus increases power. The mobile terminal 530 increases power to begin monitoring the downlinked control channel and receives the idle indication "I" in the downlinked control message 570. This aspect of FIG. 5E corresponds to Step 680 of FIG. 6.

In FIG. 5F, the mobile terminal 530 transmits a connection attempt ASRAC530 to establish a connection with the base station 510. FIG. 5F corresponds to Step 660. In summary, by ceasing reception and processing of the downlinked control channel, the mobile terminal 530 is able to save power and therefore extend battery life. Advantageously, standard mobile terminals can still function in the cell 500, which includes the enhanced E field features of FIG. 4, but they will ignore the "RUx"/"(Updated) Time Remaining" transmissions and consequently continue to constantly monitor the downlinked control channel.

The method of the present invention can be implemented in software, hardware, firmware, etc. For example, the software modules already located in base stations can be updated or new ones can be introduced to provide the features of the present invention, and the firmware or hardware in new mobile terminals can also incorporate the features of the present invention. Furthermore, mobile terminals with modifiable control code, whether the code is realized in software, firmware, insertable hardware cartridges, etc., can be updated to provide the power management features of the present invention.

Whether the invention is implemented in software, hardware, or firmware, the control code can be stored in any type of computer-accessible memory, e.g., permanent or modifiable, volatile or nonvolatile, solid-state or not, fixed or removable media, etc. Also, the memory can be, e.g., programmable array logic (PAL), random access memory (RAM), programmable read only memory (PROM), read only memory (ROM), electrically erasable programmable read only memory (EEPROM), magnetic, optical, digital versatile disk (DVD), etc. It should be noted that the present invention has a myriad of practical applications. For example, it extends the battery life of mobile terminals in communications systems.

Although a preferred embodiment of the invention includes modifications of the PE field 255, it should be noted that other fields within the PDC standard can be used to provide the remaining units information. Additionally, note that the term mobile terminal is inclusive of, for example, mobile stations and mobile computers with wireless links.

Furthermore, although exemplary embodiments of the present invention have been presented in terms of the PDC standard, it is equally applicable to all wireless communications systems that rely on random access procedures. This is particularly true for systems that rely on random access procedures to gain control of shared, multiple access channels such as, for example, the pan-European Global System for Mobile Communications (GSM), etc. Modifications necessary for implementing the present invention in conjunction with other wireless communications systems will be apparent to routineers once they have read and understood the teachings of the present invention.

Although a preferred embodiment of the method and system of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A signal format of a downlink channel slot from a base station for enabling power reduction in mobile terminals of wireless communications systems during message transmission over a multiple access channel, comprising:

a first portion, said first portion including at least one indication of whether a particular slot of said multiple access channel is busy or idle; and a second portion, said second portion including at least a first value, a second value, and a third value, each of said first, second and third values corresponding to an amount of time remaining until said particular slot of said multiple access channel will become idle, wherein power is reduced in the mobile terminal until said amount of time has transpired.

2. The signal format according to claim 1, further comprising:

a third portion, said third portion including at least one indication of whether a message from an active mobile terminal that is making said particular slot of said multiple access channel busy was received by said base station in a previous uplink channel slot.

3. The signal format according to claim 1, wherein said amount of time is expressed in terms of a number of remaining units until a current message from said active mobile terminal is completely transmitted.

4. The signal format according to claim 3, wherein said remaining units correspond to a number of transmission bursts in said predetermined slot are remaining until said predetermined slot of said multiple access channel becomes idle.

5. The signal format according to claim 3, wherein said number is comprised of five bits.

6. A mobile terminal for implementing power management during multiple access channel acquisition, comprising:

means for receiving a multiple access channel signal for a determined slot of said multiple access channel; and means for processing said multiple access channel signal, wherein said means for processing further comprises means for determining whether said determined slot of said multiple access channel is busy or idle;

means for detecting a first number of remaining units for which said determined slot of said multiple access channel will be occupied; and means for reducing power until said first number of remaining units transpires, wherein said means for reducing power is only activated if said means for detecting also detects a second number of remaining units that is identical to said first number.

7. The mobile terminal of claim 6, wherein said means for reducing power further comprises means for ceasing reception and processing of said multiple access channel signal.

8. The mobile terminal of claim 7, further comprising:

means for transmitting an attempt to establish a connection after said first number of remaining units transpires.

9. A method for reducing power consumption of a mobile terminal in a wireless communications system, comprising the steps of:

transmitting at a first time in a first slot of a multiple access channel uplink, by a first mobile terminal to a base station, a first attempt to acquire use of said first slot of said multiple access channel uplink, said first attempt including a first portion of a first message;

transmitting, by said base station, a confirmation of acquisition by said first mobile terminal of said multiple access channel uplink;

transmitting in said first slot at a second time, by said first mobile terminal to said base station, a second portion of said first message; and transmitting, by said base station on a multiple access channel downlink, a first time period that represents a duration until said first channel of said multiple access channel uplink will become available, wherein power is reduced in the mobile terminal until said duration has transpired.

10. The method according to claim 9, further comprising the steps of:

monitoring, by a second mobile terminal, said multiple access channel downlink; and ascertaining, by said second mobile terminal, said first time period.

11. The method according to claim 10, further comprising the step of:

conserving power, by said second mobile terminal, for the duration of said first time period.

12. The method according to claim 11, wherein the step of reducing power further comprises the step of:

ceasing monitoring, by said second mobile terminal, of said multiple access channel downlink.

13. The method according to claim 10, further comprising the step of:

transmitting, by said second mobile terminal to said base station, a second attempt to acquire use of said first slot of said multiple access channel uplink after the duration of said first time period, said second attempt including a first portion of a second message.

14. The method according to claim 13, further comprising the step of:

transmitting, by said base station on said multiple access channel downlink, a second time period that represents the duration until said first slot of said multiple access channel uplink will become available.

15. The method according to claim 9, wherein the step of transmitting, by said base station on said first slot of said multiple access channel downlink, a first time period that represents the duration until said first slot of said multiple access channel uplink will become available further comprises the step of:

redundantly transmitting a plurality of first time periods to improve reliability.

16. The method according to claim 9, wherein the step of transmitting, by said base station on said first slot of said multiple access channel downlink, a first time period that represents the duration until said first slot of said multiple access channel uplink will become available further comprises the step of:

transmitting said first time period within a partial echo field.

17. The method according to claim 9, wherein the step of transmitting, by said base station on said first slot of said multiple access channel downlink, a first time period that represents the duration until said first slot of said multiple access channel uplink will become available further comprises the step of:

transmitting said first time period in units of a number of transmissions on said first slot that remain to complete transmission of said first message of said first mobile terminal.

* * * * *

UNITED STATES PATENT AND TRADEMARK OFFICE
CERTIFICATE OF CORRECTION

PATENT NO.    : 6,339,713 B1                                              Page 1 of 1
DATED         : January 15, 2002
INVENTOR(S)   : Hansson et al.

It is certified that error appears in the above-identified patent and that said Letters Patent is hereby corrected as shown below:

Drawings,
Figure 5A, replace "ASRAC 120" with -- ASRAC 520 --

Column 1,
Line 5, add -- TECHNICAL FIELD OF THE INVENTION
The present invention relates in general to the communications field and, in particular, to power management in mobile communications. --

Column 6,
Line 50, replace "terminal 126" with -- terminal 120 --

Column 8,
Line 22, replace "slot 456" with -- slot 450 --

Signed and Sealed this

Seventh Day of January, 2003

JAMES E. ROGAN
*Director of the United States Patent and Trademark Office*